US009322632B2

(12) United States Patent
Zhou et al.

(10) Patent No.: US 9,322,632 B2
(45) Date of Patent: Apr. 26, 2016

(54) LINEAR POSITION SENSOR ASSEMBLY HAVING MAGNETIC SHIELD

(75) Inventors: Xinyu Zhou, Troy, MI (US); Moussa Ndiaye, Canton, MI (US); Michael Partridge, Brighton, MI (US); Xu Han, Novi, MI (US); Michael McLeod, Grand Blanc, MI (US)

(73) Assignee: GM Global Technology Operations Inc., Detroit, MI (US)

( * ) Notice: Subject to any disclaimer, the term of this patent is extended or adjusted under 35 U.S.C. 154(b) by 487 days.

(21) Appl. No.: 13/601,305

(22) Filed: Aug. 31, 2012

(65) Prior Publication Data

US 2013/0141082 A1  Jun. 6, 2013

Related U.S. Application Data

(60) Provisional application No. 61/566,944, filed on Dec. 5, 2011.

(51) Int. Cl.
| | |
|---|---|
| *G01B 7/14* | (2006.01) |
| *G01B 7/00* | (2006.01) |
| *G01D 5/20* | (2006.01) |
| *G01D 1/00* | (2006.01) |
| *G01B 1/00* | (2006.01) |

(52) U.S. Cl.
CPC .............. *G01B 7/003* (2013.01); *G01D 5/2033* (2013.01); *G01B 1/00* (2013.01); *G01B 2290/00* (2013.01); *G01D 1/00* (2013.01)

(58) Field of Classification Search
CPC ........ G01D 1/00; G01B 1/00; G01B 2210/00; G01B 2290/00; G01R 1/00
USPC ................ 324/207.13, 207.11, 206, 207.2, 324/207.21, 207.22, 207.23, 207.24, 324/207.26, 232, 242, 243, 259, 260, 117 H, 324/146, 151 R
See application file for complete search history.

(56) References Cited

U.S. PATENT DOCUMENTS

| | | | | |
|---|---|---|---|---|
| 5,955,881 | A * | 9/1999 | White | G01B 7/02 324/207.2 |
| 6,018,241 | A * | 1/2000 | White et al. | 324/207.2 |
| 6,160,395 | A * | 12/2000 | Goetz | G01B 7/003 324/207.21 |
| 6,304,078 | B1 * | 10/2001 | Jarrard | G01B 7/003 324/207.2 |
| 7,834,729 | B2 * | 11/2010 | Fullerton et al. | 335/306 |
| 2001/0035749 | A1 * | 11/2001 | Nekado | 324/207.15 |
| 2003/0217478 | A1 * | 11/2003 | Matsumiya et al. | 33/784 |
| 2007/0053554 | A1 * | 3/2007 | Fayad et al. | 382/128 |
| 2009/0027047 | A1 * | 1/2009 | Kinzel | 324/235 |

* cited by examiner

*Primary Examiner* — Huy Q Phan
*Assistant Examiner* — Temilade Rhodes-Vivour

(57) ABSTRACT

A linear position sensor assembly having a magnetic shield minimizes interference (noise) from adjacent electrical and electromagnetic devices, particularly solenoids. The sensor assembly includes a permanent magnet linear contactless displacement (PLCD) sensor comprising a pair of magnetic field sensors which are spaced apart by a member of high magnetic permeability such as a metal bar. The sensors and metal bar are enclosed, i.e., surrounded on three sides, by a cover or shield of high magnetic permeability material such as steel or mu metal, for example. A permanent magnet is disposed in sensed proximity to the sensors and translates with a clutch actuator component. When the clutch actuator component translates axially, the two field sensors provide a signal to associated electronics having high linearity, low noise and no deadband.

19 Claims, 3 Drawing Sheets

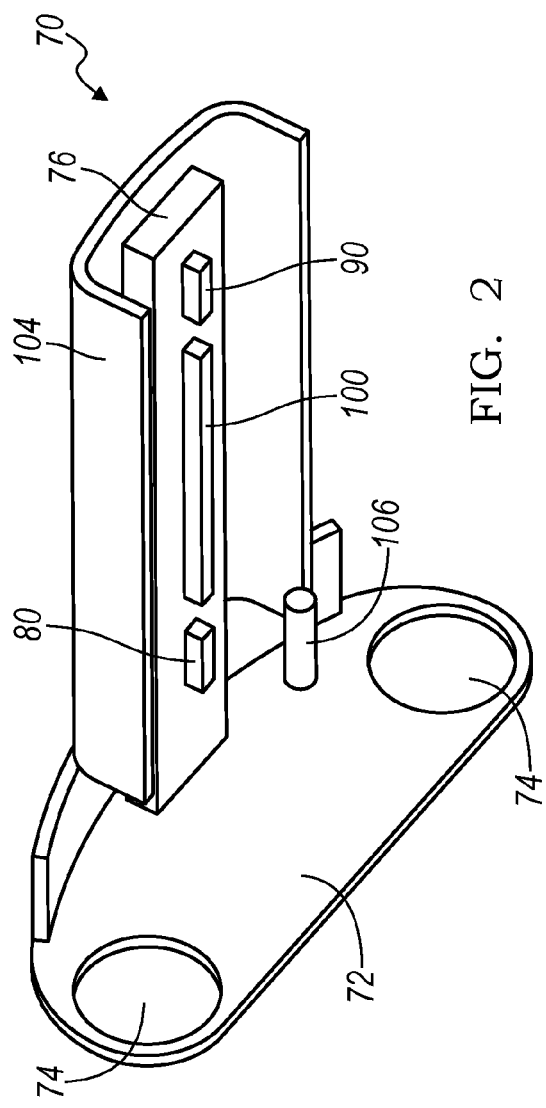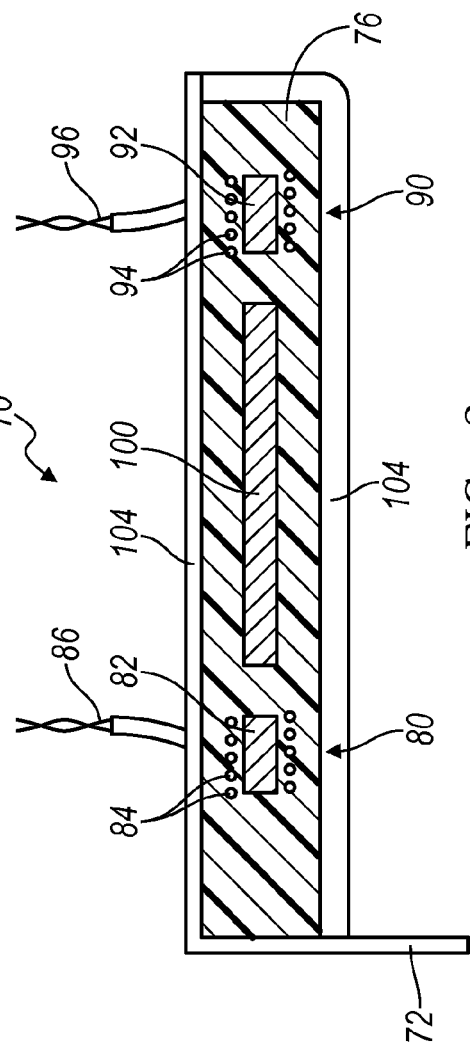
FIG. 2
FIG. 3

LINEAR POSITION SENSOR ASSEMBLY HAVING MAGNETIC SHIELD

CROSS REFERENCE TO RELATED APPLICATION

This application claims the benefit of U.S. Provisional Patent Application Ser. No. 61/566,944, filed Dec. 5, 2011, which is hereby incorporated in its entirety herein by reference.

FIELD

The present disclosure relates to interference shields for linear position sensors and more particularly to motor vehicle clutch position sensor assemblies having magnetic interference shields.

BACKGROUND

The statements in this section merely provide background information related to the present disclosure and may or may not constitute prior art.

In many modern motor vehicle transmissions, the essentially completely mechanical automatic transmission having planetary gear assemblies and hydraulically operated clutches and brakes has been superseded by transmissions having electronic controls and a plurality of sensors and solenoids. The sensors provide data relating to, for example, shaft speeds and actuator positions and the solenoids engage and disengage synchronizers and gears. Current dual clutch transmissions (DCT's) are excellent examples of this technology.

Size and packaging constraints of such dual clutch transmissions often mean that relatively powerful solenoids are located proximate speed and position sensors. This may result in one or more speed or position sensors being exposed to the magnetic fields of one or more of the solenoids. Since the solenoids will be repeatedly energized and de-energized during shift activity, the magnetic field disturbances they create can adversely impact the output signals of the speed and position sensors.

The obvious solution to this problem is to re-locate either the solenoids or the sensors. Unfortunately, re-locating the solenoids in a final or near final transmission design is akin to the tail wagging the dog: the power flow through the transmission and the shaft, synchronizer and gear arrangements take precedence over the locations of the solenoids. Re-locating the sensors is generally equally unfeasible because there are often only very narrowly defined locations where a particular motion or rotation may either be conveniently sensed or sensed at all.

Thus, it is apparent that new solutions to the problem of electromagnetic interference of sensors in transmissions are necessary and the present invention is so directed.

SUMMARY

The present invention provides a linear position sensor assembly having a magnetic shield which minimizes interference (noise) from adjacent electrical and electromagnetic devices, particularly solenoids. The sensor assembly includes a permanent magnet linear contactless displacement (PLCD) sensor comprising a pair of magnetic field sensors, which are spaced apart by a member of high magnetic permeability such as a metal bar. The sensors and metal bar are enclosed, i.e., surrounded on three sides, by a cover or shield of high magnetic permeability material such as steel or mu metal, for example. A permanent magnet is disposed in sensed proximity to the sensors and translates with a clutch actuator component. When the clutch actuator component translates axially, the two field sensors provide a signal to an associated controller having high linearity, low noise and no deadband. In dual clutch transmissions having concentric shafts, a pair of the sensor assemblies may be utilized to detect the position of each clutch.

Thus it is an aspect of the present invention to provide a linear position sensor assembly having a magnetic interference shield.

It is a further aspect of the present invention to provide a clutch position sensor assembly having a magnetic interference shield.

It is a still further aspect of the present invention to provide a linear position sensor assembly having a permanent magnet linear contact-less displacement sensor.

It is a still further aspect of the present invention to provide a clutch position sensor assembly having a permanent magnet linear contact-less displacement sensor.

It is a still further aspect of the present invention to provide a linear position sensor assembly having a pair of magnetic field sensors.

It is a still further aspect of the present invention to provide a clutch position sensor assembly having a pair of magnetic field sensors.

It is a still further aspect of the present invention to provide a clutch position sensor assembly having a pair of permanent magnet linear contactless displacement sensors spaced apart by a high magnetic permeability steel bar.

It is a still further aspect of the present invention to provide a clutch position sensor assembly having a permanent magnet linear contactless displacement sensor spaced apart by a high magnetic permeability metal member.

It is a still further aspect of the present invention to provide a clutch position sensor assembly having a permanent magnet linear contactless displacement sensor surrounded on three sides by a cover or shield of high magnetic permeability material.

It is a still further aspect of the present invention to provide a clutch position sensor assembly having a permanent magnet linear contactless displacement sensor surrounded on three sides by a cover or shield of a material such as steel or mu metal.

It is a still further aspect of the present invention to provide a clutch position sensor assembly having a permanent magnet secured to a bearing and a pair of magnetic field sensors disposed in sensing relationship.

It is a still further aspect of the present invention to provide a clutch position sensor assembly having a permanent magnet secured to a bearing and a pair of magnetic field sensors surrounded on three sides by a high magnetic permeability shield and disposed in sensing relationship with the permanent magnet.

It is a still further aspect of the present invention to provide a clutch position sensor assembly having a permanent magnet secured to a bearing and a permanent magnet linear contactless displacement sensor comprising a pair of magnetic field sensors spaced apart by a metal bar, surrounded on three sides by a high magnetic permeability shield and disposed in sensing relationship with the permanent magnet.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 2 is a perspective view of a permanent magnet linear contact-less position sensor assembly according to the present invention;

Figure 4:
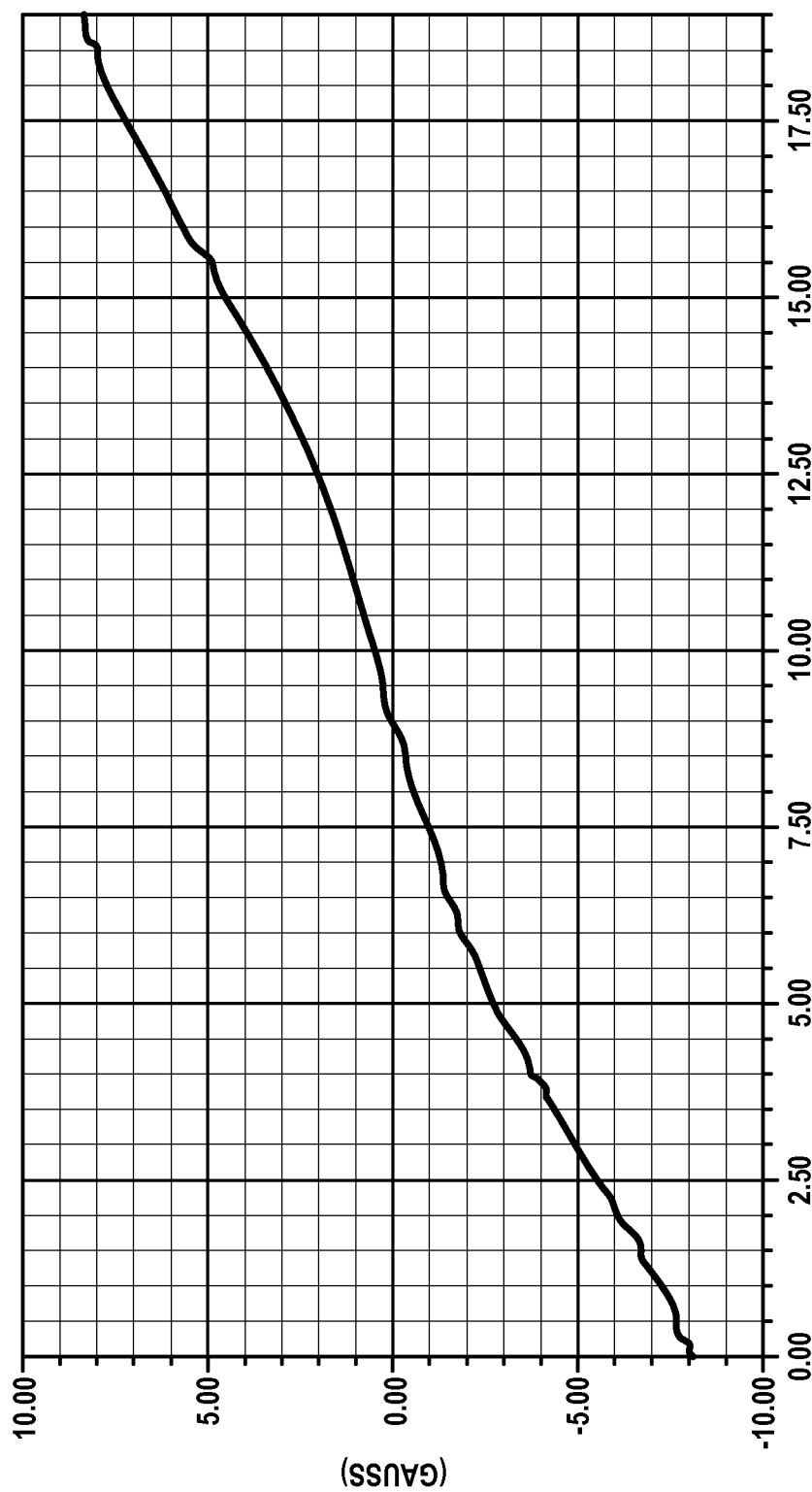

FIG. 3 is an enlarged, full sectional view of a permanent magnet linear contact-less position sensor assembly according to the present invention; and FIG. 4 is a graph of magnetic flux versus distance of a linear position sensor assembly according to the present invention highlighting the excellent linearity of a permanent magnet linear contact-less displacement (PLCD) sensor, high permeability member and shield.

DETAILED DESCRIPTION

The following description is merely exemplary in nature and is not intended to limit the present disclosure, application, or uses.

Figure 1:
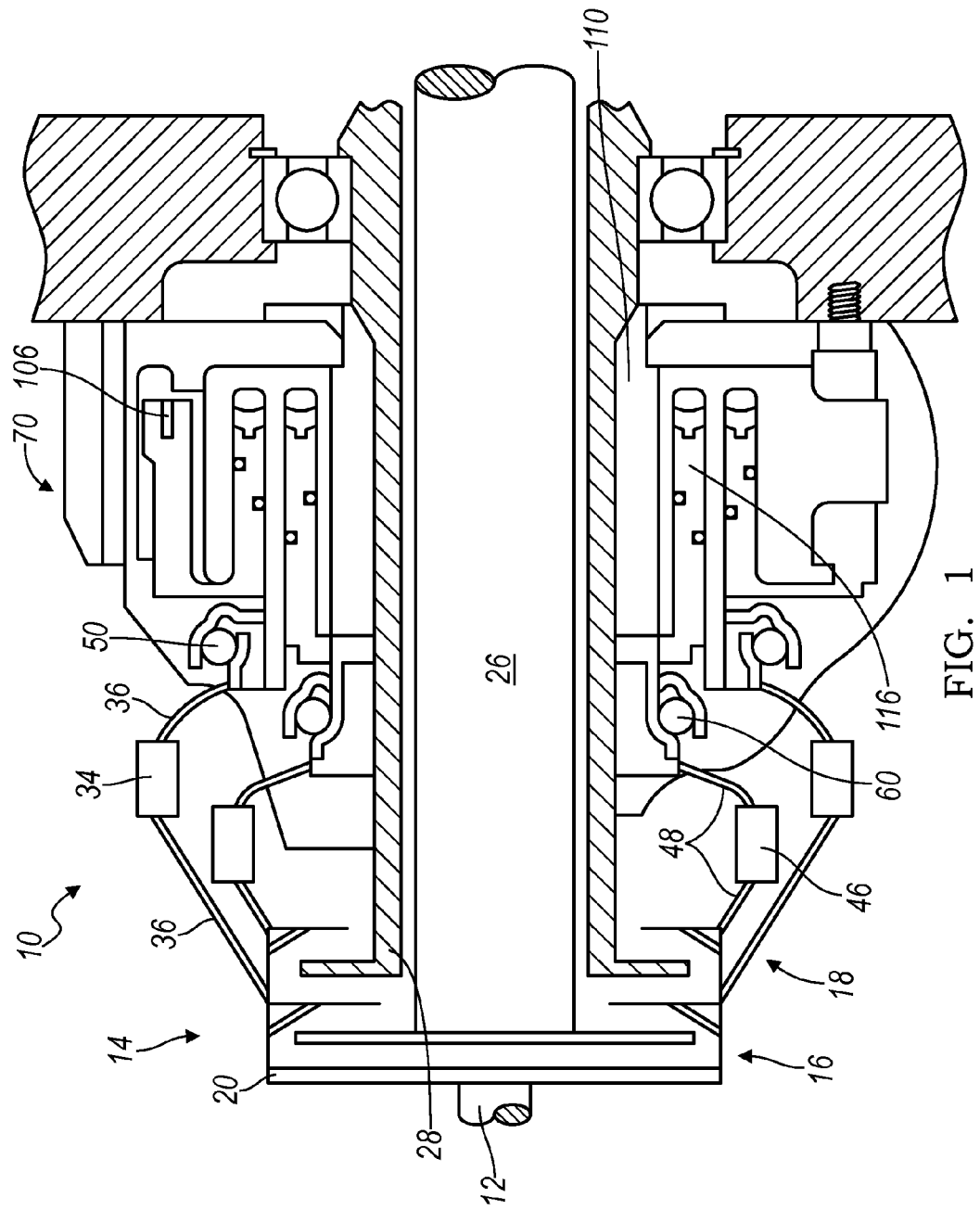
FIG. 1 is a full sectional schematic view of a portion of an exemplary dual clutch transmission showing the dual clutch bearing components and clutch position sensor assemblies according to the present invention.

With reference to FIG. 1, a portion of a typical and exemplary dual clutch transmission is illustrated and generally designated by the reference number 10. The dual clutch transmission 10 is provided with torque from a crankshaft 12 representing the output member of a prime mover such as a gasoline, Diesel, flex fuel, hybrid or electric power plant (all not illustrated). Specifically, torque is provided to a dual clutch assembly 14 having two separate and independently operable clutches: a first clutch assembly 16 and a second clutch assembly 18. Each of the clutch assemblies 16 and 18 preferably include first and second pluralities of interleaved friction plates or discs (not illustrated) which, when compressed, transmit torque between an input and an output. The input side of the dual clutch assembly is a flywheel 20 which is preferably a dual mass flywheel that is configured to dampen and reduce vibration of the crankshaft 12.

The output side of the dual clutch assembly 14, with regard to the first clutch 16, is a first, preferably solid, shaft or drive member 26 which extends into the transmission 10 and to which a first plurality of gears (not illustrated) are secured. The output side of the dual clutch assembly 14, with regard to the second clutch 18, is a second, quill or tubular drive member 28 which is concentrically disposed about (and co-axial with) the first shaft or member 26. The second quill or drive member 28 extends a shorter distance into the transmission 10 and includes a second plurality of gears (not illustrated) secured thereto.

The dual clutch assembly 14 also includes a first hydraulic actuator 34 which preferably includes an first annular piston (not illustrated) and a first linkage 36 which compresses the clutch plates in the first clutch assembly 16, thereby transmitting torque from the crankshaft 12 to the first shaft or member 26 and a second hydraulic actuator 46 which preferably includes a second annular piston (not illustrated) and a second linkage 48 which compresses the clutch plates in the second clutch assembly 18, thereby transmitting torque from the crankshaft 12 to the second quill or member 28.

Disposed about and piloted on the second quill or member 28 is a pair of bearing assemblies, a first or outer bearing assembly 50 associated with the first annular piston and the first linkage 36 of the first hydraulic actuator 34 and an inner bearing assembly 60 associated with the second annular piston and the second linkage 48 of the second hydraulic actuator 46. The outer and inner bearing assemblies 50 and 60 are actuation and isolation bearings that decouple the rotating elements of the first and second clutch assemblies 16 and 18 of the dual clutch assembly 14 (the interleaved friction plates or discs) from the non-rotating elements of the first and second hydraulic actuators 34 and 46 (the first and second annular pistons and the first and second linkages 36 and 48). As such, portions of the bearing assemblies 50 and 60 rotate while others are stationary. The outer bearing assembly 50 translates axially and bi-directionally in response to motion of the output of the first hydraulic actuator 34 and the inner bearing assembly 60 translates axially and bi-directionally in response to motion of the output of the second hydraulic actuator 46.

Referring now to FIGS. 1, 2 and 3, integrally arranged with the outer bearing assembly 50 is a first clutch position sensor or permanent magnet contactless displacement sensor (PLCD) assembly 70. The first clutch position sensor assembly 70 includes a frame or bracket 72 having a pair of mounting openings 74 or similar feature(s) which facilitates mounting within the transmission 10 with, for example, threaded fasteners. The frame or bracket 72 supports a strip or elongate pad or substrate 76 of an electrically insulating material which, in turn, supports and secures a first magnetic field sensor 80. The first magnetic field sensor 80 includes a magnetic core 82 surrounded by a coil 84. A pair of electrical leads 86 from the coil 84 provide an electrical signal to associated electronic vehicle and/or powertrain control module(s) (not illustrated).

Spaced along the elongate pad or substrate 76 from the first magnetic field sensor 80 is a second magnetic field sensor 90. The second magnetic field sensor 90 is in all respects the same as the first magnetic field sensor 80 and includes a magnetic core 92, a coil 94 disposed about the core 92 and a pair of electrical leads 96.

Disposed intermediate the first magnetic field sensor 80 and the second magnetic field sensor 90 is a preferably metal bar or member 100. The bar or member 100 is made of a high magnetic permeability material such as steel, mu metal or a similar material. Constructed of high magnetic permeability material, preferably higher than that of any of the surrounding or proximate materials, the bar or member 100 focuses or concentrates magnetic flux from an adjacent permanent magnet (see below), thereby significantly improving the linearity of the output of the first clutch position sensor 70 by reducing or eliminating any deadband that might otherwise occur due to the design of the first clutch position sensor assembly 70. The bar or member 100 may take various shapes, forms and sizes, depending upon such variables as the extent of translation of the clutch actuators 34 and 46, the spacing of the first and second magnetic field sensors 80 and 90, the material from which it is constructed and other variables. For example, when the full stroke of the output of the first hydraulic actuator 34, essentially from the fully engaged friction clutch 16 to the fully disengaged friction clutch 16, is about 20 mm. (0.79 inches), a preferable length for the metal bar or member 100 is about 13 mm. (0.51 inches).

Partially surrounding the elongate pad or substrate 76 and the first magnetic field sensor 80, the second magnetic field sensor 90 and the bar or member 100 is a generally U-shaped magnetic interference shield 104. The term "partially surrounding," as utilized herein, means relatively closely surrounding on three sides and extending substantially along the distance between the first magnetic field sensor 80 and the second magnetic field sensor 90 such that the interference shield 104 effectively and significantly suppresses electromagnetic interference generated by transmission components such as solenoids and other magnetic or magnetized components whose magnetic fields would otherwise excite and interfere with the first magnetic field sensor 80 and the second magnetic field sensor 90.

The magnetic interference shield 104 is preferably fabricated of a high magnetic permeability material, e.g., metal, such as steel, mu metal or similar material. To save fabrication and assembly steps and if desired, the frame or bracket 72 and the magnetic interference shield 104 may be a unitary, i.e., integral, component formed entirely of high magnetic permeability material. The open side of the U-shaped magnetic interference shield 104 of the first clutch position sensor assembly 70 points toward, i.e., is open toward, the first shaft or member 26 and the second quill or member 28.

Secured to an outer, non-rotating portion of the outer bearing assembly 50 and proximate, i.e., in sensed relationship with, the first clutch position sensor 70 is a first permanent magnet 106. So located and secured, the first permanent magnet 106 translates axially and bi-directionally in correspondence with the output of the first clutch actuator 34 and the motion of the first clutch linkage 36, its axial position thereby generally representing the extent or degree of engagement (and disengagement) of the first clutch assembly 16. Given the stated proximity of the first permanent magnet 106 to the first clutch position sensor 70, the first clutch position sensor 70 provides output signals representing the position of the first clutch assembly 16 which may be provided to and utilized by suitable electronics and controllers (not illustrated).

Similarly integrally arranged with the inner bearing assembly 60 is a second clutch position sensor or permanent magnet contactless displacement sensor (PLCD) assembly 110. Except for its location and those details specifically described below, the second clutch position sensor assembly 110 is essentially identical to the first clutch position sensor 70 described above and illustrated in FIGS. 2 and 3. It thus includes the frame or bracket 72, the strip or elongate pad or substrate 76, the first magnetic field sensor 80, the second magnetic field sensor 90 and the intermediate bar or member 100.

The second clutch position sensor assembly 110 also includes the high magnetic permeability, steel or mu metal, generally U-shaped magnetic interference shield 104. Here, however, the interference shield 104 is oriented differently than the magnetic shield 104 of the first clutch position sensor assembly 70 although it functions in substantially the same way and performs the same function, i.e., suppression of magnetic interference.

Secured to an outer, non-rotating portion of the inner bearing assembly 60 and proximate the second clutch position sensor 110 is a second permanent magnet 116. So located and secured, the second permanent magnet 116 translates axially and bi-directionally in correspondence with the output of the second hydraulic clutch actuator 46 and the motion of the second clutch linkage 48, its axial position thereby generally representing the extent or degree of engagement (and disengagement) of the second clutch assembly 18. Given the stated proximity of the permanent magnet 116 to the second clutch position sensor assembly 110, the second clutch position sensor assembly 110 provides output signals representing the position of the second clutch assembly 18.

Here, however, the second clutch position sensor assembly 110 is located very near the second quill or drive member 28 such that rotation of the second quill or drive member 28 and residual magnetism therein can cause interference (noise) in the output of the magnetic field sensors 80 and 90 of the second clutch position sensor assembly 110. Accordingly, instead of having the open side of the interference shield 104 face the second quill or drive member 28 as is the case with the first clutch position sensor assembly 70, the back, i.e., closed side, of the interference shield 104 faces or is adjacent the second quill or drive member 28. In other words, since the magnetic field sensors 80 and 90 of the second clutch position sensor assembly 110, due to their location, are more susceptible to magnetic interference from the second quill or member 28 than the solenoids, the interference shield 104 is disposed with its closed back between the magnetic field sensors 80 and 90 and the second quill or drive member 28.

FIG. 4 is a graph of magnetic flux versus distance of a linear position sensor assembly according to the present invention highlighting the excellent linearity of the permanent magnet linear contact-less displacement (PLCD) sensor assemblies 70 and 110. Note the excellent linearity and lack of a deadband in or near the middle of travel of the magnets 106 and 116 (and the clutch linkages 36 and 48) which is primarily the result of incorporation of the high magnetic permeability member 100 in combination with the magnetic shield 104.

It should be understood that while described above in conjunction with a dual clutch transmission and the utilization of two clutch position sensor assemblies 70 and 110 according to the present invention, the utilization of a single clutch position sensor assembly, or multiple, i.e., more than two, sensor assemblies, according to the present invention within a given device are wholly within the purview and scope of the present invention. Furthermore, the magnetically shielded linear position sensor assemblies of the present invention are not limited to clutch position sensing but, as those skilled in the art will readily realize and appreciate, they may be utilized in any linear position application where magnetic interference is present and must be minimized.

The description of the invention is merely exemplary in nature and variations that do not depart from the gist of the invention are intended to be within the scope of the invention. Such variations are not to be regarded as a departure from the spirit and scope of the invention.

What is claimed is:

1. A linear position sensor assembly for a motor vehicle transmission comprising, in combination,
    a bi-directionally translating transmission component,
    a permanent magnet affixed to said bi-directionally translating transmission component,
    a permanent magnet linear contactless displacement sensor disposed in sensing relationship with said permanent magnet, said permanent magnet linear contactless displacement sensor comprising a pair of spaced apart magnetic field sensors and a high magnetic permeability metal member disposed between said pair of magnetic field sensors, and
    a high magnetic permeability metal shield surrounding said permanent magnet linear contactless displacement sensor on at least three sides,
    whereby said metal shield reduces induction of magnetic interference from nearby transmission components in said magnetic field sensors and said metal member concentrates flux from said permanent magnet.

2. The linear position sensor assembly for a motor vehicle transmission of claim 1 wherein said translating transmission component is a clutch component.

3. The linear position sensor assembly for a motor vehicle transmission of claim 1 wherein each of said magnetic field sensors includes a magnetic core and a coil.

4. The linear position sensor assembly for a motor vehicle transmission of claim 1 wherein said high magnetic permeability metal shield is fabricated of mu metal.

5. The linear position sensor assembly for a motor vehicle transmission of claim 1 wherein said high magnetic permeability metal member is fabricated of mu metal.

6. The linear position sensor assembly for a motor vehicle transmission of claim 1 wherein said high magnetic permeability metal member has a magnetic permeability higher than nearby materials.

7. The linear position sensor assembly for a motor vehicle transmission of claim 1 wherein said pair of spaced apart magnetic field sensors and said high magnetic permeability metal member are arranged along a path parallel to said bi-directional translation of said permanent magnet.

8. The linear position sensor assembly of claim 1 wherein said permanent magnet linear contactless displacement sensor includes an insulating substrate supporting said pair of spaced apart magnetic field sensors and said high magnetic permeability metal member.

9. A magnetically shielded linear position sensor assembly comprising, in combination,
a bi-directionally translating mechanical component,
a permanent magnet affixed to said mechanical component,
a permanent magnet linear displacement sensor disposed in sensing relationship with said translating permanent magnet, said permanent magnet linear displacement sensor comprising a pair of spaced apart magnetic field sensors and a high magnetic permeability member disposed between said pair of magnetic field sensors, and
a high magnetic permeability shield partially surrounding said permanent magnet linear displacement sensor,
whereby magnetic interference from nearby components is reduced by said metal shield and said high magnetic permeability member concentrates flux from said permanent magnet.

10. The linear position sensor assembly of claim 9 wherein said translating mechanical component is a clutch operating linkage of a motor vehicle transmission.

11. The linear position sensor assembly of claim 9 wherein each of said magnetic field sensors includes a magnetic core and a coil.

12. The linear position sensor assembly of claim 9 wherein said pair of spaced apart magnetic field sensors and said high magnetic permeability member are arranged along a path parallel to said translation of said permanent magnet.

13. The linear position sensor assembly of claim 9 wherein said high magnetic permeability shield is fabricated of mu metal.

14. The linear position sensor assembly of claim 9 wherein said high magnetic permeability member is fabricated of mu metal.

15. The linear position sensor assembly of claim 9 wherein said high magnetic permeability member has a magnetic permeability higher than adjacent materials.

16. The linear position sensor assembly of claim 9 wherein said permanent magnet linear contactless displacement sensor includes an insulating substrate securing said pair of spaced apart magnetic field sensors and said high magnetic permeability metal member.

17. A linear position sensor assembly for a motor vehicle component comprising, in combination,
a bi-directionally translating element of such component,
a permanent magnet secured to said element for bi-directional translation therewith,
a permanent magnet linear displacement sensor disposed in sensing relationship with said permanent magnet, said permanent magnet linear displacement sensor comprising a pair of spaced apart magnetic field sensors and an elongate high magnetic permeability member disposed between and aligned with said pair of magnetic field sensors, and
a high magnetic permeability shield surrounding said permanent magnet displacement sensor on three sides,
whereby said shield reduces magnetic interference from nearby magnetic and electromagnetic elements of such motor vehicle component and said high magnetic permeability member concentrates flux from said permanent magnet.

18. The linear position sensor assembly for a motor vehicle component of claim 17 wherein said high magnetic permeability member and said high magnetic permeability shield are fabricated of mu metal.

19. The linear position sensor assembly for a motor vehicle component of claim 17 wherein said pair of spaced apart magnetic field sensors and said high magnetic permeability member are arranged along a path parallel to said translation of said permanent magnet.

\* \* \* \* \*